(12) United States Patent (10) Patent No.: US 8,918,755 B2
Borgsmidt et al. (45) Date of Patent: Dec. 23, 2014

(54) ENTERPRISE PERFORMANCE MANAGEMENT SOFTWARE SYSTEM HAVING DYNAMIC CODE GENERATION

(75) Inventors: Rasmus Borgsmidt, Luxembourg (LU); Michael Gould, Oulston (GB)

(73) Assignee: International Business Machines Corporation, Armonk, NY (US)

( * ) Notice: Subject to any disclaimer, the term of this patent is extended or adjusted under 35 U.S.C. 154(b) by 1741 days.

(21) Appl. No.: 11/668,937

(22) Filed: Jan. 30, 2007

(65) Prior Publication Data

US 2008/0092115 A1    Apr. 17, 2008

Related U.S. Application Data

(60) Provisional application No. 60/852,146, filed on Oct. 17, 2006.

(51) Int. Cl.
| | |
|---|---|
| *G06F 9/44* | (2006.01) |
| *G06F 7/00* | (2006.01) |
| *G06F 17/30* | (2006.01) |
| *G06F 9/455* | (2006.01) |

(52) U.S. Cl.
CPC ...... *G06F 17/30592* (2013.01); *G06F 9/45516* (2013.01)
USPC ............................. 717/106; 717/114; 707/600

(58) Field of Classification Search
CPC ........... G06F 10/06; G06F 8/20; G06F 10/10; G06F 8/10; G06F 8/71; G06F 8/24; G06F 9/4428; G06F 17/30607; G06F 8/34; G06F 8/30; G06F 8/447; G06F 8/40; G06F 8/31; G06F 8/51; G06F 9/45516; G06F 17/30592; G06F 17/30595; G06F 17/30477; G06F 17/30864; G06F 17/30392; G06F 17/30333
See application file for complete search history.

(56) References Cited

U.S. PATENT DOCUMENTS 5,956,483 A    9/1999  Grate et al.
6,002,874 A   12/1999  Bahrs et al.
(Continued)

FOREIGN PATENT DOCUMENTS

EP    1 081 611 A2    3/2001

OTHER PUBLICATIONS

Bianca Schon et al.; Three-Dimensional Spatial Information Systems: State of the Art Review; 2009 Bentham Science Publishers Ltd; retrieved online on Aug. 5, 2014; pp. 21-31; Retrieved from the Internet: <URL: http://www.google.com/url?>.*

(Continued)

*Primary Examiner* — Thuy Dao
*Assistant Examiner* — Hanh T Bui
(74) *Attorney, Agent, or Firm* — Shumaker & Sieffert, P.A.

(57) ABSTRACT

An enterprise software system provides dynamic code generation techniques that facilitate quick and efficient resolution of multi-dimensional data demands. The system includes an object store that stores a first object that references multi-dimensional data and an object model that receives a request for multi-dimensional data referenced by the first object. The object model causes the first object to dynamically generate a portion of the executable software instructions for a second object in response to the request and instantiate the second object within the object store. The dynamically generated portion of the instructions enables the second object to calculate a memory address into the multi-dimensional data referenced by the first object. The second object utilizes the dynamically generated portion of the instructions to satisfy the request. Because the second object maintains direct access to the multi-dimensional data, it need not make costly and time consuming function calls to the first object.

30 Claims, 8 Drawing Sheets

(56) References Cited

U.S. PATENT DOCUMENTS

| | | | |
|---|---|---|---|
| 6,003,039 A | 12/1999 | Barry et al. | |
| 6,151,601 A | 11/2000 | Papierniak et al. | |
| 6,272,673 B1* | 8/2001 | Dale et al. | 717/100 |
| 6,477,536 B1 | 11/2002 | Pasumansky et al. | |
| 6,605,121 B1 | 8/2003 | Roderick | |
| 6,609,123 B1 | 8/2003 | Cazemier et al. | |
| 6,732,091 B1* | 5/2004 | Middelfart | 707/718 |
| 6,757,887 B1* | 6/2004 | Kaplan et al. | 717/114 |
| 6,768,995 B2 | 7/2004 | Thier et al. | |
| 7,162,473 B2 | 1/2007 | Dumais et al. | |
| 7,181,450 B2 | 2/2007 | Malloy et al. | |
| 7,464,082 B2 | 12/2008 | Weiss | |
| 7,814,044 B2* | 10/2010 | Schwerk | 707/600 |
| 8,065,262 B2* | 11/2011 | Bailey | 707/600 |
| 8,200,604 B2* | 6/2012 | Goetsch et al. | 717/106 |
| 8,473,450 B2* | 6/2013 | Bakalash et al. | 707/600 |
| 8,650,150 B2* | 2/2014 | Zhao et al. | 707/600 |
| 2002/0087686 A1 | 7/2002 | Cronk | |
| 2002/0095430 A1* | 7/2002 | Egilsson et al. | 707/104.1 |
| 2002/0099866 A1 | 7/2002 | Vlissides | |
| 2002/0116213 A1 | 8/2002 | Kavounis et al. | |
| 2004/0098712 A1 | 5/2004 | Pisupati et al. | |
| 2004/0215626 A1* | 10/2004 | Colossi et al. | 707/100 |
| 2004/0250236 A1* | 12/2004 | O'Malley et al. | 717/106 |
| 2005/0172261 A1* | 8/2005 | Yuknewicz et al. | 717/106 |
| 2005/0256896 A1 | 11/2005 | Pfeifer et al. | |
| 2005/0278378 A1 | 12/2005 | Frank | |
| 2006/0020921 A1 | 1/2006 | Pasumansky et al. | |
| 2006/0020933 A1 | 1/2006 | Pasumansky et al. | |
| 2006/0064670 A1* | 3/2006 | Linebarger et al. | 717/106 |
| 2006/0129971 A1 | 6/2006 | Rojer | |
| 2006/0143225 A1 | 6/2006 | Brendle et al. | |
| 2006/0235811 A1 | 10/2006 | Fairweather | |
| 2007/0130133 A1 | 6/2007 | Lee et al. | |
| 2007/0174812 A1* | 7/2007 | Yang | 717/114 |
| 2007/0188491 A1 | 8/2007 | Denelsbeck et al. | |
| 2007/0240137 A1 | 10/2007 | Archambault et al. | |
| 2008/0046481 A1 | 2/2008 | Gould et al. | |
| 2008/0071843 A1 | 3/2008 | Papadimitriou et al. | |
| 2009/0077107 A1 | 3/2009 | Scumniotales et al. | |
| 2012/0180025 A1* | 7/2012 | Webb | 717/114 |
| 2014/0201128 A1* | 7/2014 | Barber | 707/600 |

OTHER PUBLICATIONS

Tamas Vajk et al.; Runtime Model Validation with Parallel Object Constraint Language; Oct. 2011; ACM; retrieved online on Aug. 5, 2014; pp. 1-8; Retrieved from the Internet: <URL: http://delivery.acm.org/10.1145/2100000/2095663/a7-vajk.pdf?>.*

Jurgita Tonkunaite et al.; Model Driven Development of Data Warehouses; 2006; IEEE; retrieved online on Aug. 5, 2014; pp. 106-113; Retrieved from the Internet < URL: http://ieeexplore.ieee.org/stamp/stamp.jsp?tp=&arnumber=1678483>.*

Defining Report Datasets for Multidimensional Data from an SAP NetWeaver BI System, msdn, Apr. 14, 2006, 2 pages.

Defining Report Datasets for Relational Data from an SAP Database, msdn, Apr. 14, 2006, 1 page.

Erich Gamma at al., Design Patterns: Elements of Reusable Object-Oriented Software, Design Patterns, pp. 257-271, XP002249829 (1995).

Erich Gamma et al., Design Patterns: Elements of Reusable Object-Oriented Software, Visitor Pattern, pp. 331-344, XP002340261 (1995).

James Noble, Classifying Relationships Between Object-Oriented Design Patterns, IEEE, Comput. Soc. US, pp. 98-107, XP010314483 (Nov. 9, 1998).

U.S. Appl. No. 11/564,011, filed Nov. 28, 2006 entitled "Virtual Multidimensional Datasets for Enterprise Software Systems," by inventors Michael Gould and Rasmus Bordgsmidt.

U.S. Appl. No. 11/563,485, filed Nov. 27, 2006 entitled "Enterprise Planning and Performance Management System Providing Double Dispatch Retrieval of Multidimensional Data," by inventors Rasmus Bordgsmidt and Michael Gould.

International Preliminary Report on Patentability from corresponding PCT Application Serial No. PCT/US07/20935 mailed Apr. 30, 2009 (8 pages).

International Search Report and Written Opinion from corresponding PCT Application Serial No. PCT/US07/20935 mailed Aug. 6, 2008 (10 pages).

Office Action from U.S. Appl. No. 11/563,485, dated Mar. 31, 2009, 18 pp.

Response to Office Action dated Mar. 31, 2009, from U.S. Appl. No. 11/563,485, filed Jun. 30, 2009, 13 pp.

Office Action from U.S. Appl. No. 11/563,485, dated Oct. 28, 2009, 16 pp.

Response to Office Action dated Oct. 28, 2009, from U.S. Appl. No. 11/563,485, filed Jan. 28, 2010, 13 pp.

Final Office Action from U.S. Appl. No. 11/563,485, dated May 17, 2010, 17 pp.

Pre-Appeal Brief Request for Review and Notice of Appeal for U.S. Appl. No. 11/563,485, filed Aug. 17, 2010, 6 pp.

Notice of Allowance for U.S. Appl. No. 11/563,485, dated Oct. 13, 2010, 8 pp.

Extended European Search Report from corresponding European Application Serial No. 07838990.5-1225 dated May 8, 2012 (8 pages).

Schmoelzer et al., "The Entity Container—An Object-Oriented and Model-Driven Persistency Cache", Proceedings of the 38th Hawaii International Conference on System Sciences, IEEE, Jan. 3, 2005 (10 pages).

* cited by examiner

ENTERPRISE PERFORMANCE MANAGEMENT SOFTWARE SYSTEM HAVING DYNAMIC CODE GENERATION

This application claims the benefit of U.S. Provisional Application Ser. No. 60/852,146, filed Oct. 17, 2006, the entire content of which is incorporated herein by reference.

TECHNICAL FIELD

The invention relates to enterprise computing environments, and more particularly, to enterprise performance management systems.

BACKGROUND

Enterprise software systems are typically sophisticated, large-scale systems that support many, e.g., hundreds or thousands, of concurrent users. Examples of enterprise software systems include financial planning systems, budget planning systems, order management systems, inventory management systems, sales force management systems, business intelligence tools, enterprise reporting tools, project and resource management systems and other enterprise software systems.

Many enterprise performance management and business planning applications require a large population of users to enter data that the software then accumulates into higher level areas of responsibility in the organization. The system may perform mathematical calculations on the data, combining data submitted by one user with data submitted by another. Using the results of these calculations, the system may generate reports for review by higher management.

A computing device for a user typically connects to the enterprise software system via a computing network. The user computing device may provide an operating environment for concurrent execution of multiple planning applications that access multidimensional data stored to a cache on the computing device. Typically, the user computing device includes a cache to store datasets requested by the user. In many cases the cache stores complex, multi-dimensional datasets, i.e., data cubes, which may be downloaded from the enterprise software system via the network connection.

Frequently, the planning applications perform operations that access and manipulate the multidimensional datasets. To perform these operations, software executing on the computing device may create and maintain additional multi-dimensional datasets within the cache to temporarily hold the subset of the data being manipulated. The software also creates software reference objects (also referred to as "data provider" objects) that enable access to the multi-dimensional data. Commonly, other software objects frequently interact with the reference objects via numerous function calls to traverse the multidimensional data and to retrieve the underlying multidimensional data.

SUMMARY

In general, enterprise planning and performance management techniques are described that utilize dynamic code generation to reduce the extensive calls between software objects when traversing and accessing multi-dimensional data.

According to the techniques, an object model maintains one or more reference objects within an object store, where each of these reference objects correspond to multi-dimensional data. The reference objects are "aware" of the dimensionality of the data, and operate as data providers by servicing requests from other objects to retrieve the multidimensional data.

Dynamic code generation techniques are described that enable the object model to cause a first software object that references multi-dimensional data to dynamically generate a portion of the executable software instructions for a second object. The dynamically generated portion of the executable software instructions enables the second object to directly calculate offsets into the multidimensional data space maintained by the first object. Through the use of this technique, the object model may more quickly and efficiently satisfy multi-dimensional data requests. For example, the second object need not make resource- and time-consuming function calls to the first object in order to traverse the dimensions of the multi-dimensional data.

In response to a multi-dimensional data request, the object model selects the appropriate reference object associated with the requested multi-dimensional data, and invokes that object to return the requested data. The object model typically returns the requested data by creation of a new object. At this time, the object model causes the first object to dynamically generate executable software instructions for inclusion within the new object. Moreover, the first object (e.g., the data provider object) generates the executable software instructions based on the particular dimensionality and arrangement of the multidimensional data that it references. The dynamically generated executable software instructions enables the second object to directly calculate indices into the multidimensional data space referenced by the first object.

After dynamically generating the portion of the executable software instructions, the first object instantiates the second object, whereupon, the second object facilitates the retrieval of the requested data by utilizing the dynamically generated portion of its executable software instructions to directly compute indices into the multi-dimensional data referenced by the first object. In one embodiment, this technique is "dynamic" in that the first object (e.g., the data provider) generates the executable software instructions during run-time in response to a data access request instead of compile-time. It is also "dynamic" in that the code is generated based on the current run-time state of the multi-dimensional data being retrieved, e.g., the dimensionality of the data. These dynamic code generation techniques may more quickly and efficiently traverse multidimensional data because they avoid function calls typically required to move the data provider through the multidimensional space, such as a MoveNext call that is often necessary between data retrieval. Instead, the second object is instantiated so that its dynamically generated executable software instructions (which were generated based on the dimensionality and arrangement of the data) directly calculate indices within the requested multi-dimensional data. Thus, the second object need only call the data provider to retrieve the data using the calculated indices, and need not repeatedly call the data provider to traverse the underlying multidimensional data using MoveNext calls or other functions.

In one embodiment, a computer-implemented method comprises receiving a request for multi-dimensional data referenced by a first object and dynamically generating a portion of the executable software instructions for a second object with the first object that references the multi-dimensional data in response to the request, wherein the portion of the executable software instructions enables the second object to calculate a memory address into the multi-dimensional data referenced by the first object. The method further comprises instantiating the second object within an object store of an enterprise planning system, wherein the second object includes the dynamically generated portion of the executable software instructions and utilizes the dynamically generated portion of the executable software instructions to satisfy the request.

In another embodiment, a computing system comprises an object store that stores a first object that references multi-dimensional data and an object model that receives a request for multi-dimensional data referenced by the first object and causes the first object to dynamically generate a portion of the executable software instructions for a second object in response to the request and instantiate the second object within the object store, wherein the portion of the executable software instructions enables the second object to calculate a memory address into the multi-dimensional data referenced by the first object, and further wherein the second object includes the dynamically generated portion of the executable software instructions and utilizes the dynamically generated portion of the executable software instructions to satisfy the request.

In another embodiment, the invention is directed to a computer-readable medium containing instructions. The instructions cause a programmable processor to receive a request for multi-dimensional data referenced by a first object and dynamically generate a portion of the executable software instructions for a second object with the first object that references the multi-dimensional data in response to the request, wherein the portion of the executable software instructions enables the second object to calculate a memory address into the multi-dimensional data referenced by the first object. The instructions further cause the processor to instantiate the second object within an object store of an enterprise planning system, wherein the second object includes the dynamically generated portion of the executable software instructions and utilizes the dynamically generated portion of the executable software instructions to satisfy the request.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
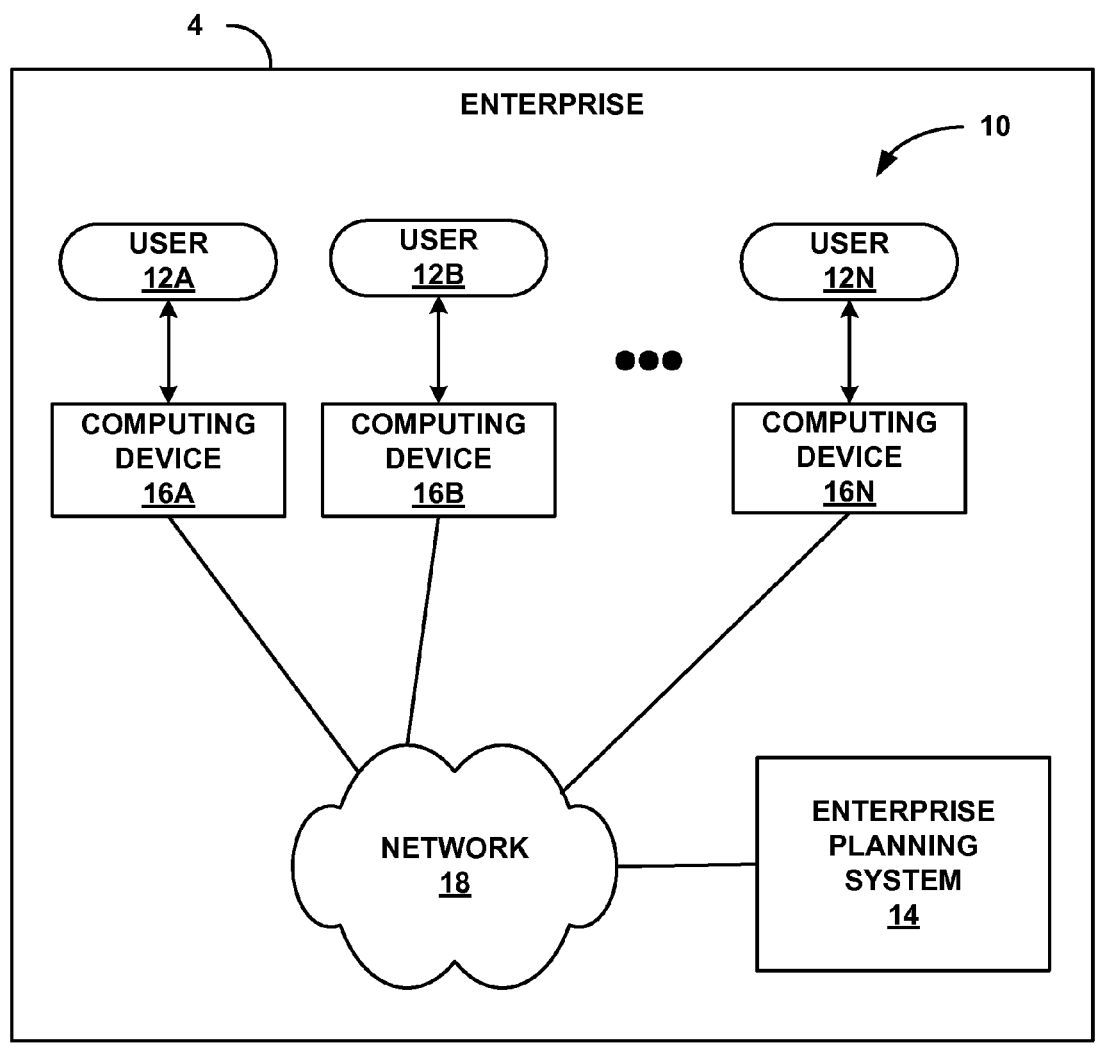
FIG. 1 is a block diagram illustrating an example enterprise having a computing environment in which a plurality of users interacts with an enterprise planning and performance management system.

FIG. 1 is a block diagram illustrating an example enterprise 4 having a computing environment 10 in which a plurality of users 12A-12N (collectively, "users 12") interacts with an enterprise planning and performance management system 14. In the system shown in FIG. 1, enterprise planning and performance management system 14 communicatively couples to a number of computing devices 16A-16N (collectively, "computing devices 16") by a network 18. Users 12 interact with their respective computing devices to access enterprise planning and performance management system 14.

For exemplary purposes, the invention is described in reference to an enterprise planning and performance management system, such as an enterprise financial or budget planning system. The techniques described herein may be readily applied to other software systems, including other large-scale enterprise software systems. Examples of enterprise software systems include order management systems, inventory management systems, sales force management systems, business intelligence tools, enterprise reporting tools, project and resource management systems and other enterprise software systems.

In general, enterprise planning and performance management system 14 enables and automates the reconciliation of top-down targets with detailed bottom-up forecasts for an enterprise. Enterprise planning and performance management system 14 implements and manages an enterprise planning process, which can be divided into three functions: (1) modeling, (2) contribution, and (3) reconciliation.

Initially, high-level enterprise managers or executives, referred to as analysts, define organizational targets, and build planning models for the enterprise. The analysts may include, for example, financial analysts, such as the chief financial officer, senior financial analysts or product and sales analysts. More specifically, the analysts develop a model having a number of hierarchically arranged nodes representing various cost centers within the organization, such as business units or departments. The analysts specify corporate target data for each node of the organizational hierarchy. Corporate target data may include financial data, revenue data, order data, inventory data, and the like, depending on the particular enterprise planning activity being carried out by the enterprise.

Next, the analysts assign one or more enterprise users to each node, such as managers, supervisors, sales representatives, lab managers, or the like, that are responsible for enterprise planning for the cost center corresponding to the node. Each enterprise user may be designated as a contributor that provides planning data to enterprise planning and performance management system 14, a reviewer that accepts or rejects contributions from the contributors, or both. The contributors and reviewers may be authorized users within the enterprise or within other entities coupled to network 18, such as suppliers or customers.

Typically, enterprise users 12 that are designated as contributors interact with enterprise planning and performance management system 14 to input detailed forecasts in the form of contribution data. As described above, enterprise users 12 may provide detailed financial forecasts, revenue forecasts, order forecasts, inventory forecasts, estimated resource requirements, and the like, depending on the particular enterprise planning activity being carried out by the enterprise.

Enterprise planning and performance management system 14 automates the reconciliation of the forecast data with the corporate target data provided by the analysts. In particular, enterprise planning and performance management system 14 operates in accordance with a defined model, i.e., the enterprise planning model created by the analysts, to provide a hierarchical planning process having multiple reconciliation levels. As each of the contributors provides his or her contribution data, enterprise planning and performance management system 14 automatically aggregates the contribution data across the enterprise in real-time, and provides access to the aggregated data to enterprise users 12 designated as reviewers associated with higher levels of the enterprise. In particular, upon receiving contribution data from the contributors, enterprise planning and performance management system 14 identifies all higher levels of the organizational model affected by the newly received contribution data, and calculates new aggregate totals at each level in real-time.

Consequently, the reviewers view aggregated data across the enterprise in real-time during the enterprise planning session. At each level, enterprise planning and performance management system 14 ensures that the reviewers, as defined by the nodes of the enterprise model, reconcile the target data with the forecast data. Each of the reviewers may, for example, reject or accept the contribution data in view of corporate targets provided by the analysts. This process continues until the contribution data is ultimately approved by the highest level of the organizational hierarchy, thereby ensuring that the contribution data from the contributors reconciles with corporate targets provided by the analysts.

In this manner, enterprise planning and performance management system 14 may provide more accurate enterprise planning than with conventional techniques. For example, enterprise planning and performance management system 14 may improve the accuracy and predictability of enterprise planning by enabling organizations to reconcile corporate models and organizational targets with detailed forecasts. The techniques may provide a platform that delivers collaborative, real-time planning capabilities, without requiring offline consolidation and aggregation of forecasts. Because enterprise planning and performance management system 14 can aggregate contribution data in real-time, all users 12 can be presented with an accurate, up-to-date view of the numbers. Further, the architecture of enterprise planning and performance management system 14 can readily scale to thousands of users, and may be designed around best planning practices. In addition, the techniques enabling high participation by enterprise users 12, i.e., the contributors and reviewers, allowing accurate planning cycles to be reduced Enterprise users 12 may utilize a variety of computing devices to interact with enterprise planning and performance management system 14 via network 18. For example, an enterprise user may interact with enterprise planning and performance management system 14 using a laptop computer, desktop computer, or the like, running a web browser, such as Internet Explorer™ from Microsoft Corporation of Redmond, Wash. Alternatively, an enterprise user may use a personal digital assistant (PDA), such as a Palm™ organizer from Palm Inc. of Santa Clara, Calif., a web-enabled cellular phone, or similar device.

Network 18 represents any communication network, such as a packet-based digital network like the Internet. In this manner, system 10 can readily scale to suit large enterprises. Enterprise users 12 may directly access enterprise planning and performance management system 14 via a local area network, or may remotely access enterprise planning and performance management system 14 via a virtual private network, remote dial-up, or similar remote access communication mechanism.

Enterprise planning and performance management system 14 may utilize a "cut-down" process by which the multi-dimensional data store is "sliced" for each user 12 in accordance with the defined enterprise model. During this process, enterprise planning and performance management system 14 identifies areas of the defined model to which users 12 are assigned, either as contributors or reviewers, and "slices" the data store based on the assignments. When a given user 12 logs in and proceeds with an enterprise planning activity, enterprise planning and performance management system 14 communicates the respective data slice to the respective computing device 16 for display to the user via the extended spreadsheet application. In this fashion, enterprise planning and performance management system 14 need not communicate the entire model to each of users 12, thereby reducing communication time as well as resource requirements. Instead, each user 12 receives only relevant information. Users 12 interact with computing devices 16 to capture contribution data, and to reconcile the contribution data with organizational targets.

As described herein, each of computing devices 16 utilize dynamic code generation to reduce the extensive calls between software objects when traversing and accessing multi-dimensional data. Typically, within computing devices 16, planning applications interact with an application programming interface (API) to issue requests to an object model, all of which are described in more detail below in reference to FIG. 2. The object model maintains one or more objects within an object store, where each of these objects reference multi-dimensional data. In response to a data access request, the object model selects an appropriate object that references the requested multi-dimensional data, and causes that object to return the requested multidimensional data. In returning the requested data, the object model causes the reference object to dynamically generate a portion of the executable software instructions for a second object. The dynamically generated portion of the executable software instructions enables the second object to directly calculate offsets into the multidimensional data space maintained by the first object. Through the use of this technique, the object model may more quickly and efficiently satisfy multi-dimensional data requests. For example, the second object need not make resource- and time-consuming function calls to the first object in order to traverse the dimensions of the multi-dimensional data.

In one embodiment, these dynamic code generation techniques are "dynamic" in that the first object generates the executable software instructions during run-time in response to a data access request instead of at compile-time. It is also "dynamic" in that it generates the executable software instructions based on the current run-time state of the multi-dimensional data being retrieved. These dynamic code generation techniques may more quickly and efficiently traverse multidimensional data because they avoid function calls typically required to move the data provider through the multidimensional space, such as a MoveNext call that is often necessary between data retrieval. Instead, the second object is instantiated so that it's dynamically generated executable software instructions (which were generated based on the dimensionality and arrangement of the data) directly calculate indices within the requested multi-dimensional data. Thus, the second object need only call the data provide to retrieve the data using the calculated indices, and need not repeatedly call the data provider to traverse the underlying multidimensional data using MoveNext calls or other functions. Because computing devices 16 typically access and manipulate large amounts of multi-dimensional data, eliminating or reducing the number of inter-object calls associated with traversing the multidimensional data and updating reference information within the reference object may significantly increase the speed and efficiency of retrieving multi-dimensional data.

Figure 2:
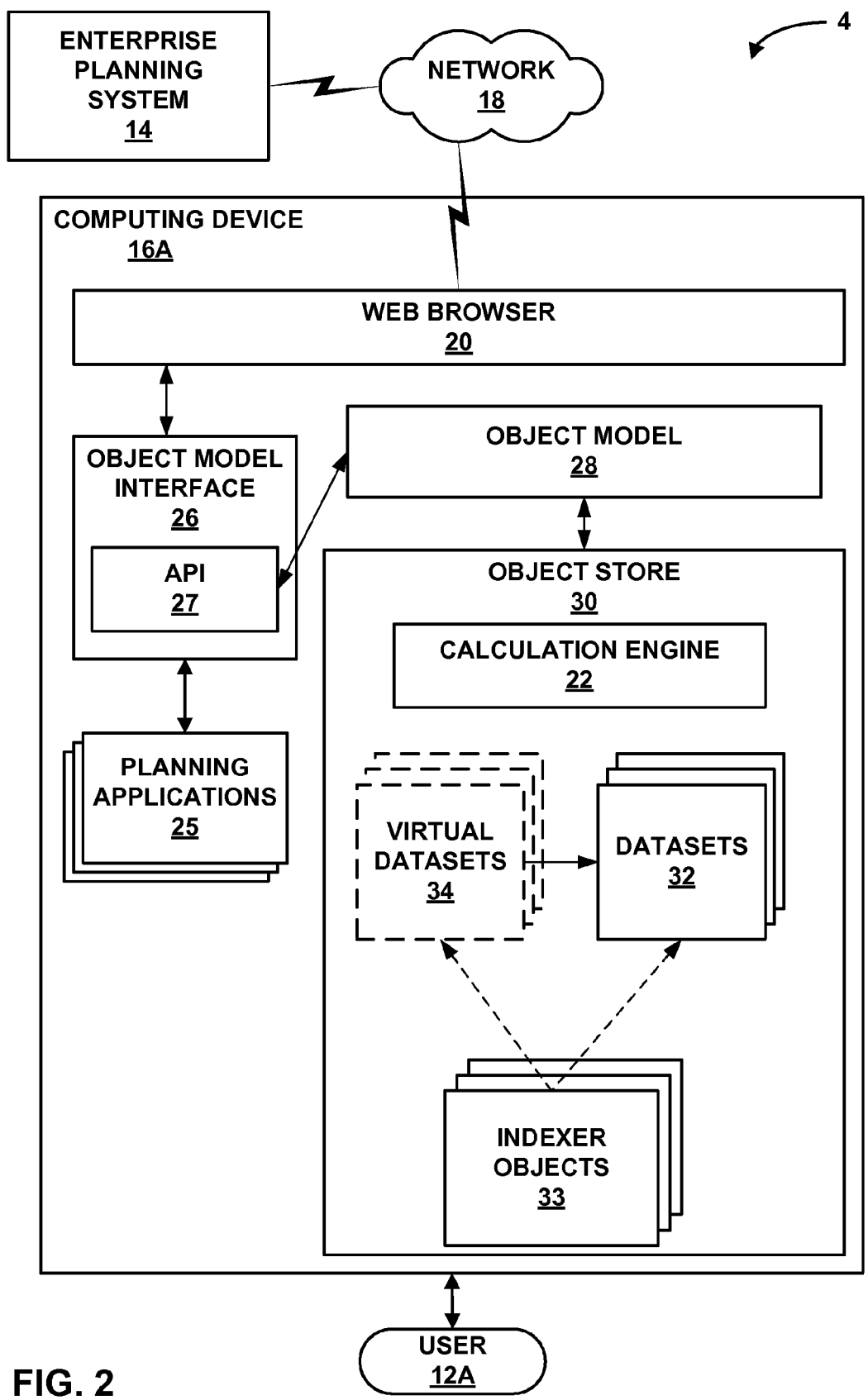
FIG. 2 is a block diagram illustrating one embodiment of a computing device for interacting with the enterprise planning and performance management system of FIG. 1.

FIG. 2 is a block diagram illustrating one embodiment of a computing device 16A for interacting with enterprise planning system 14. In the exemplary embodiment, computing device 16A includes a web browser 20, one or more planning applications 25, an object model interface 26, an object model 28, and an object store 30. Computing device 16A includes computer-readable media to store executable instructions for causing a programmable processor to carry out the methods described herein.

Planning applications 25 represent planning applications executing on computing device 16A. For example, planning applications 25 may include reporting tools, modeling tools, spreadsheet applications, data collection templates, business intelligence tools, or other types of enterprise planning applications.

Object model interface 26 comprises an application programming interface (API) 27 that exposes object model 28. For example, object model 28 may be a metadata model for datasets 32 that represent multidimensional data from one or more data cubes. Object store 30 may comprise memory, such as a cache, that stores specific instantiations of object model 28.

In general, object model 28 represents any hierarchy of data objects, and may comprise a series of collections and objects within the collections. In other words, object model 28 may comprise a hierarchy of objects, each of which contains a collection which in turn provides access to one or more objects. Object model 28 may be wrapped to protect the objects within the collections. In this way, user 12A and planning applications 25 cannot directly alter the data within object model 28. Instead, planning applications 25 interact with object model 28 via object model interface 26, and more particularly API 27, to specify operations object model 28 may perform. In particular, object model interface 26 receives operation calls from planning applications 25 via API 27 and may return the result of the operations to planning applications 25. Typically, these operation calls constitute requests for multi-dimensional data referenced by one or more of the below described objects stored in object store 30.

In the example of enterprise planning, user 12A may interact with web browser 20 to enter and manipulate enterprise planning data, such as budget or forecast data. Datasets 32 contain multidimensional planning data, which may include top-down targets, and bottom-up contribution data, and allows all calculations for an enterprise planning session to be performed locally by computing device 16A. Therefore, in this example, a contributor can modify his or her respective contribution data, and perform calculations necessary for the enterprise planning process without necessarily accessing enterprise planning system 14. User 12A may save the planning data locally, and submit the planning data to enterprise planning system 14 for aggregation with the planning data from other users 12.

Enterprise planning system 14 automatically aggregates the contribution data across enterprise 4 in real-time, and provides access to the aggregated data to reviewers associated with higher levels of the enterprise. This process continues until the contribution data is ultimately approved by the reviewers associated with the highest level of the organizational hierarchy, thereby ensuring that the contribution data from the contributors reconciles with corporate targets.

In one embodiment, calculation engine 22 and datasets 32 are loaded for use during the enterprise planning session. Calculation engine 22 may, for example, comprise a forward calculation engine 22 wrapped in an Active X object built in an array-based language. In other embodiments, calculation engine 22 may be implemented by creating layered function datasets within object store 30.

As illustrated in FIG. 2, object store 30 includes a variety of software objects. In this example, object store includes datasets 32, virtual datasets 34 and indexer objects 33. Datasets 32 each represent objects for storing data in a multi-dimensional format, e.g., in a format having multiple dimensions, where each dimension may have a hierarchy of levels and members. Datasets 32 may be loaded onto computing device 16A from enterprise planning system 14 or may result from operations performed on other datasets 32 or virtual datasets 34.

Virtual datasets 34 each store information relating to the result of an operation applied to one or more datasets 32, possibly in combination with other virtual datasets 34. Moreover, virtual datasets 34 may be manipulated by planning applications 25 as if actual datasets. For example, planning applications 25 may perform selection operations, time-series operations, discreet mathematical operation (e.g., addition or subtraction), appending or dataset combination operations and many other operations so as to manipulate multidimensional data. Planning applications 25 may layer function operations utilizing the virtual datasets 34 so as to perform complex mathematical operations involving numerous discreet mathematical operations.

However, unlike datasets 32, virtual datasets 34 are represented in FIG. 2 as dashed boxes and termed "virtual" because they do not actually store multidimensional data that resulted from the operation. To the contrary, a virtual dataset 34 only stores information necessary to resolve and retrieve the resultant multidimensional data from the underlying multidimensional datasets 32 that were originally used as inputs to the operation that produced the respective virtual dataset. Because virtual datasets 34 do not store the resultant multidimensional data but only refer to it, virtual datasets 34 may occupy less space in a cache (not shown in FIG. 2) of computing device 16A. Further, as described below, computing device 16A need not "resolve" the result, i.e., access the underlying hierarchy of data objects referred to by virtual datasets 34, until planning applications 25 subsequently attempt to retrieve the underlying data. Moreover, because virtual datasets 34 only store a reference to the data objects, object store 30 need not repeatedly synchronize virtual datasets 34 upon altering, editing, and/or updating data objects referenced by virtual datasets 34 and stored within datasets 32. Exemplary virtual datasets are described in detail within U.S. patent applicant Ser. No. 11/564,011, filed Nov. 28, 2006, entitled "VIRTUAL MULTIDIMENSIONAL DATASETS FOR ENTERPRISE SOFTWARE SYSTEMS," the content of which is incorporated herein by reference.

Planning applications 25 specify operations that object model 28 performs upon datasets 32 and virtual datasets 34 through interactions with object model interface 26. As one example, API 27 of object model interface 26 provides the following syntax by which planning applications may specify a selection operation:

<Result>=<Source>.Select(<Selector>)
Planning applications 25 specify the <Result>, <Source>, and <Selector> fields of the ".Select( )" method, or selection operation. The <Source> and <Selector> fields may accept any of datasets 32 and virtual datasets 34. As described below, the selection operation may accept multiple datasets via the <Selector> field, thereby allowing planning applications 25 to specify dataset projections through the use of the selection operation, as described in more detail below. The <Selector> field may be referred to as the argument list of the selection operation, in these and other instances. The <Result> field requires that planning applications 25 specify a unique name or handle for an object by which planning applications 25 may later access the result of the selection operation.

In this example, the object identified by the <Result> field comprises a virtual dataset; however, in some embodiments, the object identified by the <Result> field may comprise a dataset as well. In these embodiments, object model 28 may require that object model interface 26 indicate whether to resolve the virtual dataset indicated in the <Result> field. If object model interface 26 indicates that the resulting virtual dataset should be resolved, object model 28 will build a dataset 32 containing the items referred to by the resulting virtual dataset. Planning applications 25 issue this select command to object model interface 26 via API 27, which in turn, causes object model 28 to perform the select and instantiate a new virtual dataset 34 in object store 30 containing the reference to one or more of datasets 32.

Object model 28 also instantiates indexer objects 33 that provide object interfaces for maintaining references (e.g., indices) into datasets 32 and virtual datasets 34, where one or more of indexer objects 33 may reference the same dataset or virtual dataset. For example, datasets 32 may each be instantiations of classes implementing IDataset interfaces. The IDataset interface provides a "getIndexer" method to instantiate one of indexer objects 33 and associate the newly instantiated one of indexer objects 33 to the calling one of datasets 32. In some embodiments, the "getIndexer" method may return an instantiation of a previously defined, custom indexer class that was dynamically generated with the appropriate references to dataset 32. That is, the getIndexer method may dynamically generate a custom indexer class at runtime and then instantiate an instance of the custom indexer class. Subsequent invocations of the first function to instantiate the indexer object may not need to regenerate the custom indexer class. The IDataset interface also provides a "getElement" method that accepts an Indexer object 33 as a parameter. Upon invoking the "getElement" method by passing an indexer object 33, the "getElement" method returns value of the data element referenced by the indices of the passed indexer object 33.

Indexer objects 33 may each be instantiations of classes implementing the IIndexer interface, where the IIndexer interface provides a "moveNext" method for traversing the multidimensional data of a dataset or virtual dataset. When the "moveNext" method is invoked, the called indexer object 33 moves, or updates, its reference to an associated one of datasets 32 such that the reference references the next data element within datasets 32. The "moveNext" method may not necessarily move the reference to the sequential next data element of the associated dataset 32, but may instead move the reference according to some pre-defined pattern specified by the indexer. In other embodiments, a custom view of a dataset may be defined. In some cases, an indexer may sequentially follow a pattern described by the custom view, yet traverse the underlying dataset in a non-sequential pattern. Moreover, the indexer may not necessarily traverse all of the elements of the dataset, and may access some of the elements multiple times depending on the defined view.

Object model 28 next invokes the "getElement" method of the appropriate one of datasets 32 passing the associated indexer object 33 as a parameter for the "getElement" method. Upon invoking the "getElement" method, the appropriate dataset 32 safely returns the value of the requested data element referenced by the associated indexer object 33. "Safely" above refers to safely returning a type-specific object instead of a generic object, which would not ensure type safety. Thus, "safely" refers to type safety. This double dispatch data retrieval technique enables compilers to determine type-safety of the underlying classes at compile time, unlike conventional data retrieval techniques that do not support type-safety determination during compile time. By enabling type-safety checks at compile time, object model 28 may safely invoke a generic indexer object 33 without fear of violating type safety concerns during run-time, unlike conventional data retrieval techniques that may encounter debilitating type safety issues during run-time with little recourse.

Exemplary indexer objects are described in detail within U.S. patent applicant Ser. No. 11/563,485, filed Nov. 27, 2006, entitled "ENTERPRISE PLANNING AND PERFORMANCE MANAGEMENT SYSTEM PROVIDING DOUBLE DISPATCH RETRIEVAL OF MULTIDIMENSIONAL DATA," the content of which is incorporated herein by reference.

As described herein, a dataset 32 or virtual dataset 34 may create a custom indexer class by dynamically generating code defining the indexer class. The dynamically generated executable software instructions defining the indexer class may include multiple "shortcuts" that save time and/or computing resources in maintaining reference information with respect to the underlying dataset or virtual dataset, such as in response to invocation of a "moveNext" call.

The dynamically defined indexer class is produced to include executable software instructions that enable one or more indexer objects 33 to be instantiated with the coded "shortcuts." In some circumstances these shortcuts, for example, enable indexer objects 33 to update indices into the multidimensional data space of datasets or virtual datasets without having to make function calls to the underlying dataset that physically stores the multi-dimensional data.

For example, as generic objects, indexer objects 33 can be invoked to traverse any type of dataset 32 or virtual dataset 34. When a planning application 25 invokes a moveNext function of an indexer object 33 to update the objects indices with respect to a particular dataset 32 or virtual dataset 34, the indexer object typically invokes the dataset or virtual dataset to re-compute the indices based on the particular dimensionality and structure of the underlying multidimensional data. However, in accordance with the techniques described herein, the invoked indexer object 33 first determines whether the particular dataset 32 or virtual dataset 34 being traversed is the same dataset or virtual dataset that created the class on which the indexer object is based. If so, the indexer object 32 avoids the inter-object call to the dataset 32 or virtual dataset 34 to re-compute the indexer's indices. Instead, the indexer object invokes the executable instructions that were dynamically generated when the indexer's class was generated. The executable instructions of the indexer class were generated based on the dimensionality and structure of the dataset that created the class and, therefore, are able to directly update the indices of the instantiated indexer object 33. This code may allow, for example, the instantiated indexer object 33 to quickly perform its defined "moveNext" function by adding an offset, or some multiple thereof, to a stored base address given the codes "awareness" of the dimensions, levels and members of the referenced data, thereby avoiding function calls to the underlying dataset that stores the referenced multi-dimensional data.

Examples of virtual dataset 34 supported by API 27 of object model interface 26 include virtual function datasets and virtual selection datasets. For example, API 27 provides the following syntax by which planning applications may specify a function operation to build virtual function dataset objects:

<Result>=function(<Source1>, <Source2>, <Function>)

Planning applications 25 specify dataset the <Source 1>, <Source2>, <Function>, and <Result> fields of the above function operation. The <Source1> and <Source2> fields may each accept any dataset and/or a virtual dataset object, such as virtual selection datasets, virtual function datasets objects, and/or aggregation datasets objects. Planning applications 25 may specify any sort of discreet mathematical operation in the <Function> field, such as addition, subtraction, multiplication, division, etc. The <Result> field requires that planning applications 25 specify a unique name by which planning applications 25 may later access the result of the function operation. Planning applications 25 may layer function operations to perform complex mathematical operations involving numerous discreet mathematical operations.

The function operation returns a virtual function dataset object having a placeholder for storing reference information should object model 28 receive a demand for multi-dimensional data referenced by the newly created virtual function dataset object. Upon receiving a demand for multi-dimensional data referenced by the newly created virtual function dataset, object model 28 resolves, i.e., determines the references to the multi-dimensional data for, the appropriate one of the virtual function dataset objects. Typically, during resolution of the newly created virtual function dataset object, this object passes, in turn, a code object to each virtual dataset and/or dataset defined in the <Source1> and <Source2> fields above, where each of these datasets dynamically generate the executable software instructions for virtual function dataset object.

For example, the virtual function dataset object may pass a code object to one of the virtual selection dataset objects specified in the <Source1> field, whereupon this virtual selection dataset object, or more generally a first object, dynamically generates a portion of the executable software instructions for the virtual function dataset object, or more generally a second object. Next, the virtual function dataset object may pass the same code object to another virtual selection dataset object, or more generally a third object, whereupon it dynamically generates another portion of the code for the virtual function dataset object, or again the second object. In both instances the first and third objects may generate a portion of the code for a data provider element of the virtual function dataset object that enables the data provider element to calculate memory addresses directly into the memory space referenced by both the first and third virtual dataset objects without having to make function calls to both of these objects in order to access their referenced multi-dimensional data. The first and third objects return this code to the virtual function dataset object via the code object originally passed to them, or in some instances, the code object may be passed by reference thereby allowing edits to the code object without having to pass the code object back to the virtual function dataset object.

Upon dynamically generating the executable software instructions for the data provider element, the virtual function dataset object may quickly and efficiently access the multi-dimensional data for both datasets defined in the <Source 1> and <Source2> via the data provider element that incorporates the dynamically generated portions of code. The virtual function dataset object may satisfy the demand by utilizing the data provider element to quickly and directly access the underlying multi-dimensional data referenced by both the first and third objects, applying the function defined in the <Function> field, and returning the result of applying the function to the multi-dimensional data to the object model. Although not described explicitly herein, virtual function dataset objects 32 may be utilized in this manner to quickly perform complex mathematical operations through the use of layered function operations.

Planning applications 25 may also specify aggregation dataset objects via API 27 in a manner similar to specifying virtual selection and function dataset objects. Unlike virtual dataset objects, aggregation dataset objects store the underlying multi-dimensional data instead of a reference to the multi-dimensional data. Upon specifying the aggregation dataset objects via API 27, object model 28 creates an aggregation dataset object, but does not include a placeholder for reference information, as aggregation dataset objects require no reference information. Instead, object model 28 creates a placeholder for storing the actual multi-dimensional data, which it will populate upon receiving a demand for multi-dimensional data stored to the aggregation dataset object.

Upon receiving such a demand, object model 28 may invoke a "populate" function of the appropriate aggregation dataset object, where the "populate" function may pass a code object to those virtual datasets and/or datasets to be aggregated into the aggregation dataset object. Similar to the dynamic code generation technique described above in reference to virtual function dataset objects, each source dataset object of the aggregate operation, or more generally a first object, dynamically generates the executable software instructions for the aggregation dataset object, or more generally a second object. Once all of the source dataset objects have dynamically generated their portion of the code, the aggregation dataset object may utilize the code to build a data provider element that quickly and efficiently employs the coded "shortcuts" to directly calculate memory addresses into the memory space of the multi-dimensional data referenced and/or stored by the respective virtual datasets and/or datasets defined in the <Source> fields of the aggregate operation. Using the data provider, aggregation dataset objects may populate their placeholder with the requested data and return this data to object model 28 to satisfy the demand.

In this manner, computing device 16A may utilize these dynamic code generation techniques to quickly access multi-dimensional data and efficiently satisfy demands for various forms of multi-dimensional data. In the instance of virtual selection dataset objects, dynamically generated custom indexer class code may instantiate indexer objects 33 that provide quick and efficient access to multi-dimensional data defined by a selection operation. In the instance of virtual function dataset objects, dynamically generated code portions may define portions of a data provider for quickly and efficiently accessing multi-dimensional data upon which it applies a defined function. Similarly, in the instance of aggregation dataset objects, the dynamically generated code portions may define portions of a data provider for quickly and efficiently accessing multi-dimensional data used to populate its placeholder. In each instance, the dynamically generated executable software instructions enables quick and efficient access by enabling direct access to the multi-dimensional data without having to make costly and time consuming function calls.

While the technique described above includes passing a code object to dynamically generate code for virtual selection dataset objects and aggregation dataset objects, in other embodiments, both virtual selection dataset objects and aggregation dataset objects may infer the dimensionality and references to the underlying data, thereby generating the code themselves. That is, virtual selection dataset objects may, for example, already have access to this information via the datasets defined in the <Source> and <Selector> fields. Using these references to the <Source> and <Selector> fields, virtual selection dataset objects may access their respective dimensionality and references to the underlying data and dynamically generate the code based on this information. Similarly, aggregation dataset objects may also dynamically generate the above code through access to the datasets defined in its <Source> field. Thus, the invention should not be limited strictly to passing a code object, but may include other methods by which the code is dynamically generated.

Figure 3:
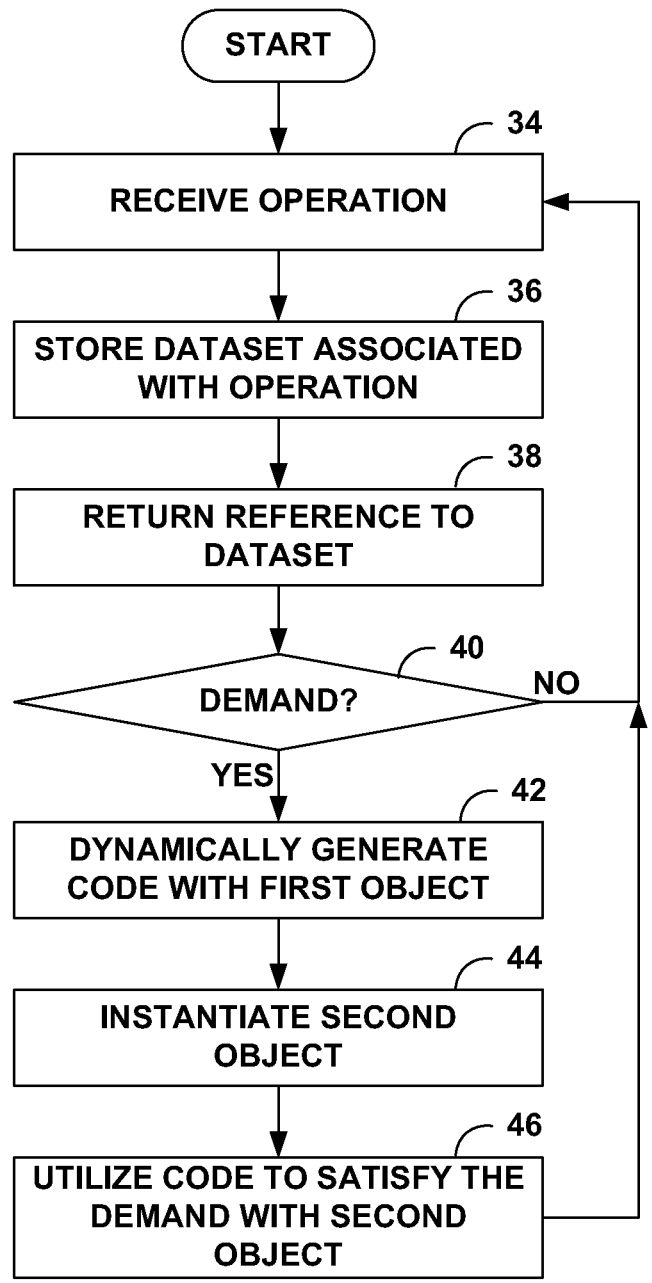
FIG. 3 is a flow chart illustrating an example operation of a computing device of an enterprise planning and performance management system in implementing the dynamic code generation techniques described herein.

FIG. 3 is a flow chart illustrating an example operation of a computing device of an enterprise planning and performance management system, such as computing device 16A of FIG. 2, in implementing the dynamic code generation techniques described herein. Although described in reference to computing device 16A, i.e., a "client-side" implementation, the dynamic code generation techniques described herein may also be performed "server-side," or within enterprise planning and performance management system 14, and the principles of the invention should not be limited as such. In server-side embodiments, object interface 26, object model 28, and object store 30 may reside within enterprise planning and performance management system 14 and perform the operations described herein in accordance with the principles of the invention.

Initially, object model 28 receives an operation, such as one of the above described selection, function, or aggregate operations, via API 27 from one of planning applications 25 (34). Upon receiving the operation, object model 28 creates and stores the virtual dataset object, such as respective virtual selection or function datasets objects, or a dataset object, such as an aggregation dataset object, in object store 30 (36). After storing these objects 32, object model 28 returns a reference to the newly created object in the form of a handle, as described above (38).

Next, object model 28 waits to receive a request pertaining to the newly created one of objects 30, which is commonly referred to as a "demand." If no demand is received, object model 28 may receive other operations and perform the above described actions to create and store other virtual datasets and/or datasets ("NO" 40). However, upon receiving a request for multi-dimensional data either referenced or stored by the newly created one of objects 30 or first object, i.e., receive a demand for this multi-dimensional data ("YES" 40), object model 28 invokes the relevant function to cause the first object to satisfy the demand. In all instances the first object dynamically generates a portion of the executable software instructions for a second object, such as indexer object in the instance the demand requests multi-dimensional data referenced by one of virtual selection datasets objects (42).

After dynamically generating the portion of the executable software instructions for the second object, the first object instantiates the second object within object store 30 such that the second object includes the dynamically generated portion of the code (44). The second object, which as described herein may include an indexer object, a virtual function dataset object, or an aggregate object, utilizes the dynamically generated portion of the code to satisfy the demand (46). Typically, the second object utilizes the dynamically generated portion of the code to calculate memory addresses directly into the memory space that stores the requested, i.e., demanded, multi-dimensional data without having to make any function calls to the object that stores the multi-dimensional data, as described above. Thus, the dynamically code generation techniques facilitate quick and efficient demand resolution by enabling such resolution without making possibly thousands if not more function calls to the objects that reference and/or store the multi-dimensional data.

Figure 4:
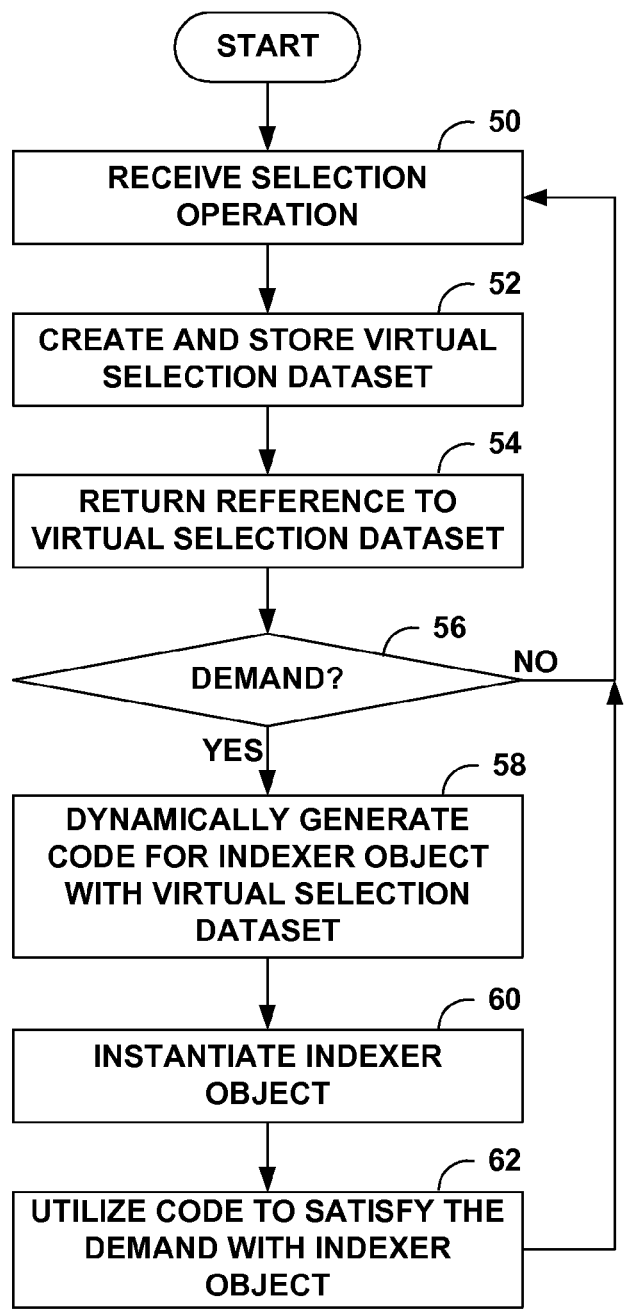
FIG. 4 is a flowchart illustrating an example operation of a computing device of an enterprise planning and performance management system in implementing the dynamic code generation techniques to service a selection operation.

FIG. 4 is a flowchart illustrating an example operation of a computing device of an enterprise planning and performance management system, such as computing device 16A of FIG. 2, in implementing the dynamic code generation techniques to service a selection operation. Initially, object model 28 receives the selection operation from planning application 25 via API 27 (50). The selection operation may conform to the above described syntax, and object model 28 creates and stores a virtual selection dataset object to object store 30, as described above (52). In particular, object model 28 creates and stores a virtual selection dataset object having a placeholder for storing reference information should object model 28 receive a demand for multi-dimensional data referenced by the newly created virtual selection dataset object. Object model 28 also returns a reference to the newly created virtual selection dataset object to planning applications 25, typically in the form of a handle (54).

Next, object model 28 waits to receive a demand for multi-dimensional data referenced by the newly created virtual selection dataset object. If no demand is received, object model 28 may continue to create and store virtual selection dataset objects or any other object described herein ("NO" 56). However, assuming object model 28 receives a demand for multi-dimensional data referenced by the newly created virtual selection dataset object ("YES" 56), object model 28 resolves, i.e., determines the references to the multi-dimensional data for, the newly created virtual selection dataset objects. Typically, during resolution of the newly created virtual selection dataset object, this first object instantiates a new indexer object 33, or a second object, via its interface's "getIndexer" function.

This new indexer object 33 creates a custom indexer class by dynamically generating code defining the indexer class and may do so either as a part of its instantiation (not shown in FIG. 4) or after object model 28 receives the demand (58 of FIG. 4). The dynamically generated code defining the indexer class may include multiple "shortcuts" that save time should one of planning applications 25 demand the multi-dimensional data referenced by the newly created virtual selection dataset object.

The "getIndexer" function of the interface provided by a virtual selection dataset object constitutes a first function for instantiating a new indexer object 33. The "getIndexer" function compiles the dynamically generated code defining the custom indexer class, instantiates an indexer object 33, and passes the newly instantiated indexer object 33 out to the newly created virtual selection dataset object in the form of a handle (60). The virtual selection dataset utilizes the newly instantiated indexer object 33 to satisfy the demand, which in turn causes the indexer object 33 to utilize its dynamically generated portion of its code (62).

Typically, the dynamically generated executable software instructions define an indexer class that enables the instantiated indexer object 33 to perform the coded "shortcuts," where most of the shortcuts typically enable indexer objects 33 to calculate a memory address into the memory space that stores the multi-dimensional data referenced by the first object, or virtual selection dataset object, without having to make function calls to the underlying dataset that physically stores the multi-dimensional data. Moreover, this code may result in an instantiated indexer object 33 capable of quickly performing its defined "moveNext" function by adding a set value, or some multiple thereof, to a stored base address, thereby again avoiding function calls to the underlying dataset that stores the referenced multi-dimensional data.

Figure 5:
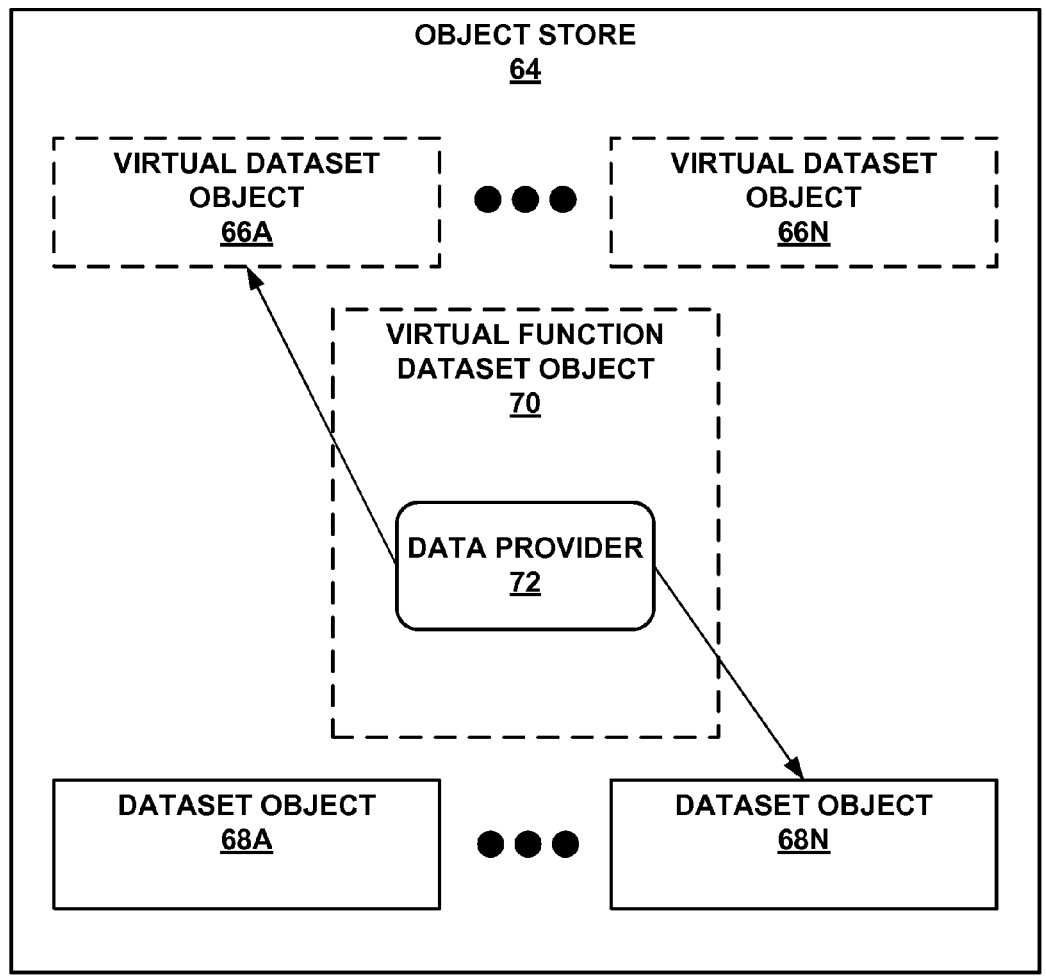
FIG. 5 is a block diagram illustrating an object store of a computing device of an enterprise planning and performance management system in more detail.

FIG. 5 is a block diagram illustrating an object store 64 of a computing device of an enterprise planning and performance management system in more detail. Object store 64 may be substantially similar to object store 30 of FIG. 2 in that it stores a plurality of virtual datasets objects 66A-66N ("virtual datasets objects 66") and dataset objects 68A-68N ("dataset objects 68"). Virtual dataset objects 66 may comprise virtual selection dataset objects, and virtual function dataset objects, as well as other virtual dataset objects not described herein. Dataset objects 68 may comprise aggregation dataset objects, such as aggregation dataset objects, as well as other dataset objects that store multi-dimensional data.

As shown in FIG. 5, object store 64 also stores virtual function dataset object 70. Although shown as storing a single object 70, object store 64 may store multiple virtual function dataset objects similar to virtual function dataset object 70, and the invention should not be limited as such. Virtual function dataset object 70 includes a data provider element 72 that implements the dynamically generated portion of the code described above. Typically, in response to a function operation, an object model, such as object model 28, creates and stores virtual function dataset 70 to object store 64. Upon being stored to object store 64, virtual function dataset object 70 may not initially include data provider element 72, as no demand has yet been received for multi-dimensional data referenced by virtual function dataset object 70. Thus, FIG. 5 illustrates a virtual function dataset object 70 after object model 28 received a demand for multi-dimensional data referenced by virtual function dataset object 70.

Assuming for purposes of illustration that a demand has been received, object model 28 invokes a function via the handle associated with virtual function dataset object 70 to satisfy the demand. In response to this invocation, virtual function dataset object 70 passes a code object to those virtual datasets 66 and datasets 68 specified in the <Source1>, <Source2> fields of the function operation, where each of these virtual datasets 66 and/or datasets 68 dynamically generate the code for data provider element 72. Although described in reference to two source datasets for purpose of example, virtual function datasets do not require two source datasets and may utilize a single source dataset (e.g., a square root function) or more than two source datasets.

For example, virtual function dataset object 70 passes a code object to virtual dataset objects 66A specified in the <Source 1> field, whereupon this virtual dataset object 66A, or more generally a first object, dynamically generates a portion of the code for virtual function dataset object 70, or more generally a second object. In addition, virtual function dataset object 70 may pass the same code object to dataset object 68N, or more generally a third object, whereupon it dynamically generates another portion of the code for virtual function dataset object 70, or more generally the second object. In both instances the first and third objects may generate a portion of the code for data provider element 72 of virtual function dataset object 70 that enables data provider element 72 to calculate memory addresses directly into the memory space referenced by both first and third objects 66A, 68N, respectively, without having to make function calls to both of these objects 66A, 68N in order to access their respective referenced and stored multi-dimensional data. The first and third objects return this code to the virtual function dataset object via the code object originally passed to them, or in some instances, the code object may be passed by reference thereby allowing edits to the code object without having to pass the code object back to virtual function dataset object 70.

Upon dynamically generating the code for data provider element 72, virtual function dataset object 70 may quickly and efficiently access the multi-dimensional data for both datasets defined in the <Source 1> and <Source2> via data provider element 72 that incorporates the dynamically generated portions of code. Virtual function dataset object 70 may satisfy the demand by utilizing data provider element 72 to quickly and directly access the underlying multi-dimensional data referenced by both the first and third objects, applying the function defined in the <Function> field, and returning the result of applying the function to the multi-dimensional data to object model 28. Although illustrated in FIG. 5 as referencing one of each of virtual dataset objects 66 and dataset objects 68 by the use of arrowed lines, virtual function dataset object 70 may reference two of virtual dataset objects 66 or two of dataset objects 68, and the invention should not be limited strictly to the illustrated embodiment.

Figure 6:
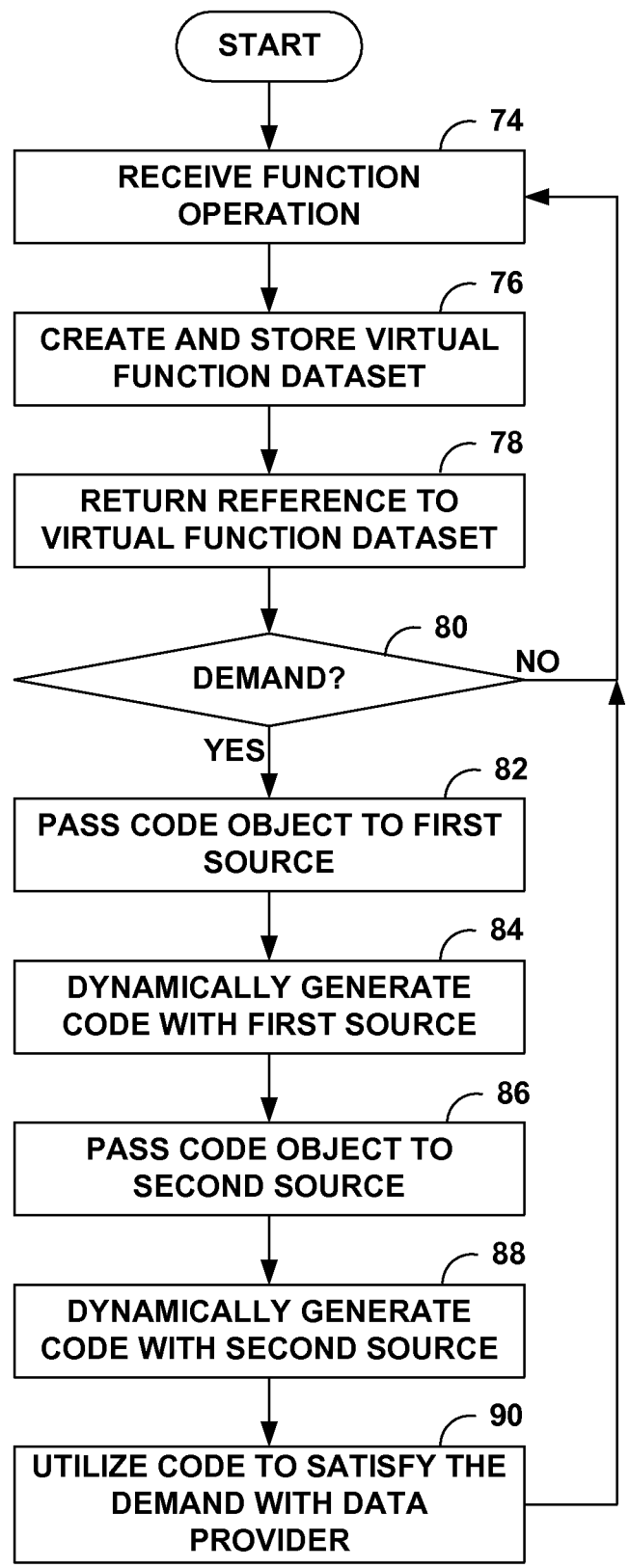
FIG. 6 is a flowchart illustrating an example operation of a computing device of an enterprise planning and performance management system in implementing the dynamic code generation techniques to service a function operation.

FIG. 6 is a flowchart illustrating an example operation of a computing device of an enterprise planning and performance management system, such as computing device 16A of FIG. 2, in implementing the dynamic code generation techniques to service a function operation. Initially, object model 28 receives the function operation from planning application 25 via API 27 (74). The function operation may conform to the above described syntax, and object model 28 creates and stores a virtual function dataset object 70 to object store 64, as described above (76). In particular, object model 28 creates and stores a virtual function dataset object 70 having a placeholder (not shown in FIG. 5) for storing reference information should object model 28 receive a demand for multi-dimensional data referenced by the newly created virtual function dataset object 70. Object model 28 also returns a reference to the newly created virtual function dataset object 70 to planning applications 25, typically in the form of a handle (78).

Next, object model 28 waits to receive a demand for multi-dimensional data referenced by the newly created virtual function dataset object 70. If no demand is received, object model 28 may continue to create and store virtual function dataset objects 70 or any other objects 66, 68 described herein ("NO" 80). However, assuming object model 28 receives a demand for multi-dimensional data referenced by the newly created virtual function dataset object 70 ("YES" 80), object model 28 resolves, i.e., determines the references to the multi-dimensional data for, virtual function dataset object 70. Typically, during resolution of the newly created virtual function dataset object 70, object 70 passes a code object to each virtual dataset 66 and/or dataset 68 defined in the <Source1> and <Source2> fields above, where each of these datasets dynamically generate the code for data provider element 72 of virtual function dataset object 70.

For example, virtual function dataset object 70 may pass a code object to one of virtual dataset objects 66 specified in the <Source 1> field (82), whereupon virtual dataset object 66A for example, or more generally a first object, dynamically generates a portion of the code for virtual function dataset object 70, or more generally a second object (84). Next, the virtual function dataset object may pass the same code object to dataset object 68N for example, or more generally a third object (86), whereupon it dynamically generates another portion of the code for virtual function dataset object 70, or more generally the second object (88). In both instances the first and third objects may generate a portion of the code for a data provider element of virtual function dataset object 70 that enables the data provider element to calculate memory addresses directly into the memory space referenced by both the first and third dataset objects 66A, 68N without having to make function calls to both of these objects in order to access their referenced multi-dimensional data. The first and third objects return this code to the virtual function dataset object via the code object originally passed to them, or in some instances, the code object may be passed by reference thereby allowing edits to the code object without having to pass the code object back to virtual function dataset object 70.

Upon dynamically generating the code for the data provider element, virtual function dataset object 70 may quickly and efficiently access the multi-dimensional data for both datasets defined in the <Source 1> and <Source2> via data provider element 72 that incorporates the dynamically generated portions of code. Virtual function dataset object 70 may satisfy the demand by utilizing data provider element 72 to quickly and directly access the underlying multi-dimensional data referenced by both the first and third objects, applying the function defined in the <Function> field, and returning the result of applying the function to the multi-dimensional data to the object model, thereby satisfying the demand (90).

Figure 7:
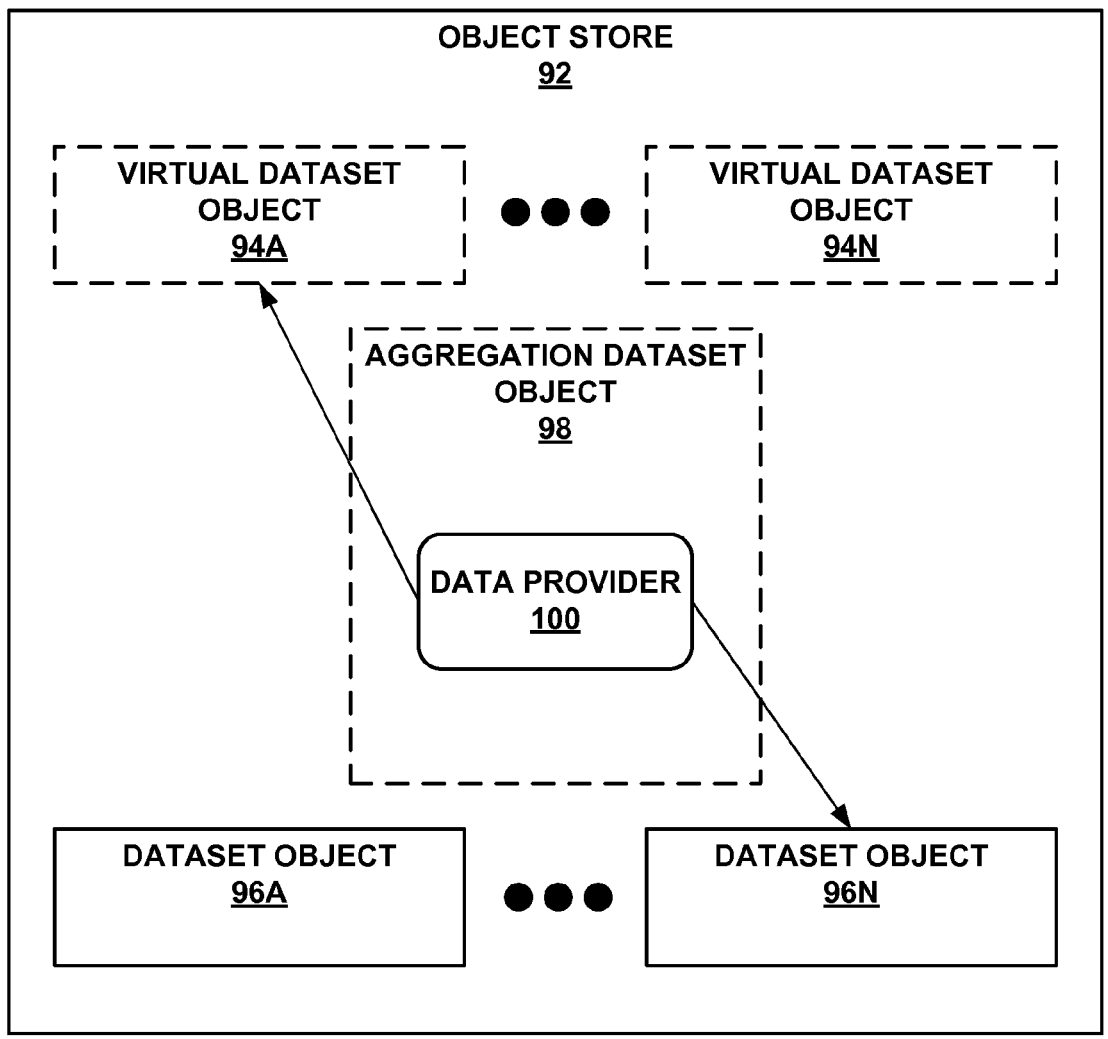
FIG. 7 is a block diagram illustrating another object store of a computing device coupled to an enterprise planning and performance management system in more detail.

FIG. 7 is a block diagram illustrating another object store 92 of a computing device coupled to an enterprise planning and performance management system in more detail. Object store 92 may be substantially similar to object store 30 of FIG. 2 in that it stores a plurality of virtual datasets objects 94A-94N ("virtual datasets objects 94") and dataset objects 96A-96N ("dataset objects 96"). Virtual dataset objects 94 may comprise virtual selection dataset objects, such as virtual selection dataset objects, and virtual function dataset objects, such as virtual function dataset objects, as well as other virtual dataset objects not described herein. Dataset objects 96 may comprise aggregation dataset objects, such as aggregation dataset objects, as well as other dataset objects that store multi-dimensional data.

In the example of FIG. 7, object store 92 stores aggregation dataset object 98. Although shown as storing a single object 98, object store 92 may store multiple aggregation dataset objects similar to aggregation dataset object 98, and the invention should not be limited as such. Aggregation dataset object 98 includes a data provider element 100 that implements the dynamically generated portion of the code described above. Typically, in response to an aggregation operation, an object model, such as object model 28, creates and stores virtual function dataset 98 to object store 92. Upon being stored to object store 92, aggregation dataset object 98 may not initially include data provider element 100, as no demand has yet been received for multi-dimensional data referenced by aggregation dataset object 98. Thus, FIG. 7 illustrates an aggregation dataset object 98 after object model 28 received a demand for multi-dimensional data referenced by aggregation dataset object 98.

Assuming for purposes of illustration that a demand has been received, object model 28 invokes a populate function via the handle associated with aggregation dataset object 98 to satisfy the demand. In response to this invocation, aggregation dataset object 98 passes a code object to one or more of virtual dataset objects 94 and/or dataset objects 96 to be aggregated into aggregation dataset object 98. Similar to the dynamic code generation technique described above in reference to virtual function dataset objects 70 of FIG. 5, each source dataset object of the aggregate operation, or more generally a first object, dynamically generates the code for aggregation dataset object 98, or more generally a second object. An aggregation operation typically has only a single source (e.g., aggregation of "sales" over all "products). However, aggregation may be performed using two or more source dataset objects.

Once all of the source dataset objects have dynamically generated their portion of the code, aggregation dataset object 98 may utilize the code to build data provider element 100 that quickly and efficiently employs the coded "shortcuts" to directly calculate memory addresses into the memory space of the multi-dimensional data referenced and/or stored by the respective virtual dataset objects 94 and/or dataset objects 96 defined in the <Source> fields of the aggregate operation. Using data provider element 100, aggregation dataset object 98 may populate the placeholder with the requested data and return this data to object model 28 to satisfy the demand.

For example, aggregation dataset object 98 may pass a code object to one of virtual dataset objects 94 specified in the <Source 1> field, whereupon virtual dataset object 94A for example, or more generally a first object, dynamically generates a portion of the code for aggregation dataset object 98, or more generally a second object. In some cases, aggregation dataset object 98 may pass the same code object to another dataset object, e.g., dataset object 96N for example, or more generally a third object, whereupon it dynamically generates another portion of the code for aggregation dataset object 98, or more generally the second object.

In such instances the source object(s) may generate a portion of the code for data provider element 100 of aggregation dataset object 98 that enables data provider element 100 to calculate memory addresses directly into the memory space referenced by both the source dataset objects (e.g., dataset objects 94A, 96N in this example) without having to make function calls to both of these objects in order to access their referenced and stored multi-dimensional data. The source dataset object(s) return this code to aggregation dataset object 98 via the code object originally passed to them, or in some instances, the code object may be passed by reference thereby allowing edits to the code object without having to pass the code object back to aggregation dataset object 98.

Upon dynamically generating the code for data provider element 100, aggregation dataset object 98 may quickly and efficiently access the multi-dimensional data for the dataset(s) defined in the <Source 1> and optionally the <Source2> via data provider element 100 that incorporates the dynamically generated portions of code. Aggregation dataset object 98 may satisfy the demand by utilizing data provider element 100 to quickly and directly access the underlying multi-dimensional data referenced by the source dataset object(s) and returning the multi-dimensional data to object model 28, thereby satisfying the demand.

Figure 8:
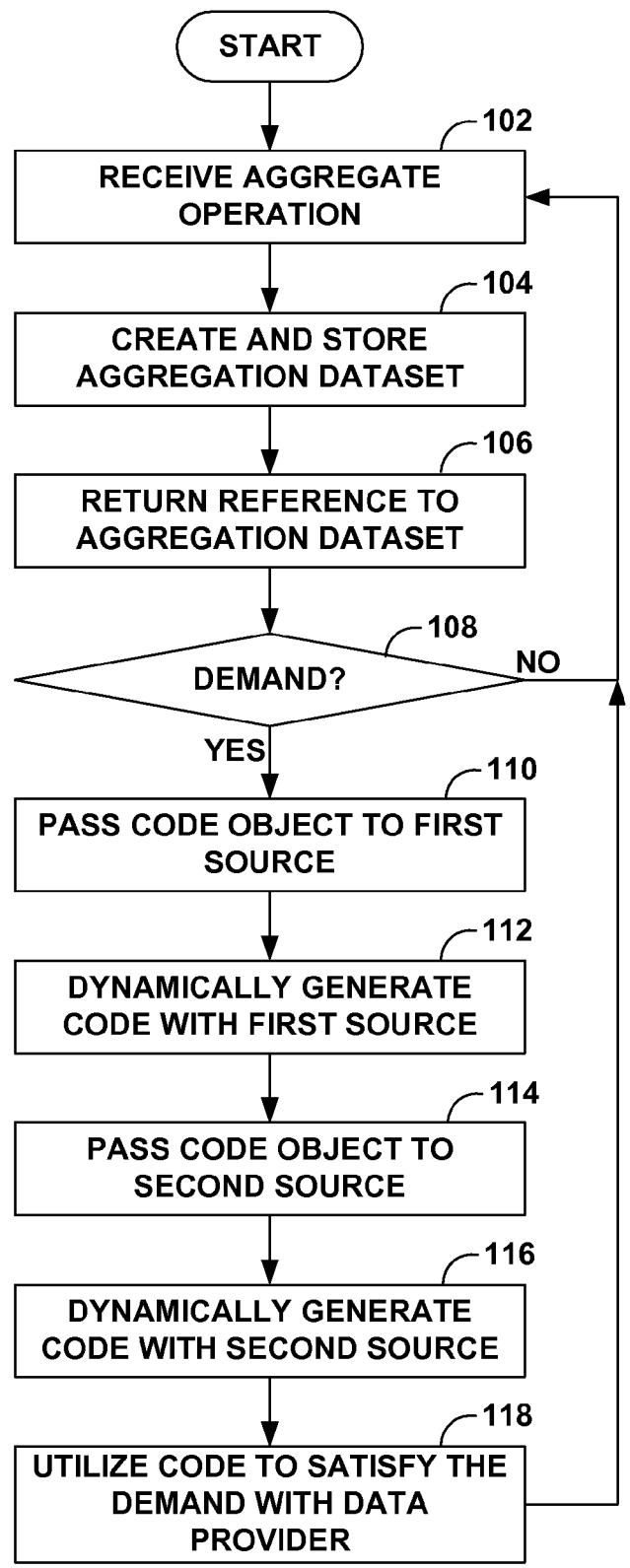
FIG. 8 is a flowchart illustrating an example operation of a computing device of an enterprise planning and performance management system in implementing the dynamic code generation techniques to service an aggregate operation.

FIG. 8 is a flowchart illustrating an example operation of a computing device of an enterprise planning and performance management system, such as computing device 16A of FIG. 2, in implementing the dynamic code generation techniques to service an aggregate operation. Initially, object model 28 receives the aggregate operation from planning application 25 via API 27 (102). Object model 28 creates and stores a aggregation dataset object 98 to object store 92, as described above (104). In particular, object model 28 creates and stores an aggregation dataset object 98 having a placeholder (not shown in FIG. 7) for storing reference information should object model 28 receive a demand for multi-dimensional data referenced by the newly created aggregation dataset object 98. Object model 28 also returns a reference to the newly created aggregation dataset object 98 to planning applications 25, typically in the form of a handle (106).

Next, object model 28 waits to receive a demand for multi-dimensional data referenced by the newly created aggregation dataset object 98. If no demand is received, object model 28 may continue to create and store other aggregation dataset objects, similar to aggregation dataset object 98, or any other objects 94, 96 described herein ("NO" 108). However, assuming object model 28 receives a demand for multi-dimensional data referenced by the newly created aggregation dataset object 98 ("YES" 108), object model 28 resolves, i.e., determines the references to the multi-dimensional data for, aggregation dataset object 98. Typically, during resolution of the newly created aggregation dataset object 98, object 98 passes a code object to each virtual dataset 94 and/or dataset 96 defined in the <Source1> and <Source2> fields above, where each of these datasets dynamically generate the code for data provider element 100 of aggregation dataset object 98. Although not explicitly described, this dynamic code generation process may apply to two or more virtual dataset objects 94 and/or dataset objects 96, and the invention should not be limited as such. In instances where more than two objects 94 and/or 96 are specified in the aggregate operation, aggregation dataset object 98 continues to pass the code object to these subsequent objects 94 and/or 96, where these objects 94 and/or 96 dynamically generate additional portions of the code for data provider element 100.

For example, in instances where two sources are specified, aggregation dataset object 98 may pass a code object to one of virtual dataset objects 94 specified in the <Source1> field (110), whereupon virtual dataset object 94A for example, or more generally a first object, dynamically generates a portion of the code for aggregation dataset object 98, or more generally a second object (112). Next, aggregation dataset object 98 may pass the same code object to dataset object 96N for example, or more generally a third object (114), whereupon it dynamically generates another portion of the code for aggregation dataset object 98, or more generally the second object (116). In both instances the first and third objects may generate a portion of the code for data provider element 100 of aggregation dataset object 98 that enables data provider element 100 to calculate memory addresses directly into the memory space referenced by both the first and third dataset objects 94A, 96N without having to make function calls to both of these objects in order to access their referenced and stored multi-dimensional data. The first and third objects return this code to aggregation dataset object 98 via the code object originally passed to them, or in some instances, the code object may be passed by reference thereby allowing edits to the code object without having to pass the code object back to aggregation dataset object 98.

Upon dynamically generating the code for data provider element 100, aggregation dataset object 98 may quickly and efficiently access the multi-dimensional data for both datasets defined in the <Source1> and <Source2> via data provider element 100 that incorporates the dynamically generated portions of code. Aggregation dataset object 98 may satisfy the demand by utilizing data provider element 100 to quickly and directly access the underlying multi-dimensional data referenced by both the first and third objects and returning the multi-dimensional data to object model 28, thereby satisfying the demand (118).

Various embodiments of the invention have been described. These and other embodiments are within the scope of the following claims.

The invention claimed is:

1. A computer-implemented method comprising:
   during the execution of an enterprise software application on a computer system, receiving a request for multi-dimensional data referenced by a first object, the first object being maintained by an object model within an object store of an enterprise planning system;
   in response to receiving the request, the object model causing the first object to dynamically generate at least a portion of executable software instructions for a second object, wherein the portion of the executable software instructions is based on at least one of a dimensionality and arrangement of the multi-dimensional data referenced by the first object, wherein the portion of the executable software instructions enables the second object to calculate a memory address into the multi-dimensional data referenced by the first object; and
   instantiating, by the first object, the second object within the object store of the enterprise planning system, wherein the second object includes the dynamically generated portion of the executable software instructions and utilizes the dynamically generated portion of the executable software instructions to satisfy the request.

2. The method of claim 1, wherein receiving the request for multi-dimensional data comprises receiving a request for multi-dimensional data referenced by one of a virtual dataset object, a virtual selection dataset object, and a dataset object.

3. The method of claim 1, wherein the portion of the executable software instructions enables the second object to further calculate the memory address into the multi-dimensional data referenced by the first object without having to make a function call to the first object.

4. The method of claim 1,
   wherein dynamically generating the portion of the executable software instructions comprises dynamically generating a portion of the executable software instructions for an indexer object with the first object that references the multi-dimensional data in response to the request, and
   wherein the portion of the executable software instructions enables the indexer object to calculate a memory address into the multi-dimensional data referenced by the first object.

5. The method of claim 4, wherein dynamically generating the portion of the executable software instructions comprises dynamically generating a portion of the executable software instructions for the indexer object with a virtual selection dataset object that references the multi-dimensional data in response to the request.

6. The method of claim 1, wherein dynamically generating the portion of the executable software instructions comprises dynamically generating a portion of the executable software instructions for a data provider element included within a virtual function dataset object with the first object that references the multi-dimensional data in response to the request, and
   wherein the portion of the executable software instructions enables the data provider element to calculate a memory address into the multi-dimensional data referenced by the first object.

7. The method of claim 6, wherein dynamically generating the portion of the executable software instructions further comprises dynamically generating another portion of the executable software instructions for the data provider element included within the virtual function dataset object with a third object that references additional multi-dimensional data in response to the request, and wherein the portion of the executable software instructions enables the data provider element to calculate a memory address into the additional multi-dimensional data referenced by the third object.

8. The method of claim 7, wherein dynamically generating the portion of the executable software instructions further comprises:
passing an executable software instructions object to the first object with the virtual function dataset object;
dynamically generating the portion of the executable software instructions for the data provider element of the virtual function dataset object with the first object;
writing the dynamically generated portion of the executable software instructions to the executable software instructions object with the first object;
passing the executable software instructions object to the third object with the virtual function dataset object;
dynamically generating the other portion of the executable software instructions for the data provider element of the virtual function dataset object with the third object; and
writing the dynamically generated other portion of the executable software instructions to the executable software instructions object with the third object.

9. The method of claim 1,
wherein dynamically generating the portion of the executable software instructions comprises dynamically generating a portion of the executable software instructions for a data provider element included within an aggregation dataset object with the first object that references the multi-dimensional data in response to the request, and
wherein the portion of the executable software instructions enables the data provider element to calculate a memory address into the multi-dimensional data referenced by the first object.

10. The method of claim 9,
wherein dynamically generating the portion of the executable software instructions further comprises dynamically generating another portion of the executable software instructions for the data provider element included within the aggregation dataset object with a third object that references additional multi-dimensional data in response to the request, and
wherein the portion of the executable software instructions enables the data provider element to calculate a memory address into the additional multi-dimensional data referenced by the third object.

11. The method of claim 10, wherein dynamically generating the portion of the executable software instructions further comprises:
passing an executable software instructions object to the first object with the aggregation dataset object;
dynamically generating the portion of the executable software instructions for the data provider element of the aggregation dataset object with the first object;
writing the dynamically generated portion of the executable software instructions to the executable software instructions object with the first object;
passing the executable software instructions object to the third object with the aggregation dataset object;
dynamically generating the other portion of the executable software instructions for the data provider element of the aggregation dataset object with the third object; and
writing the dynamically generated other portion of the executable software instructions to the executable software instructions object with the third object.

12. The method of claim 1,
wherein dynamically generating the portion of the executable software instructions comprises dynamically generating java byte-code executable software instructions for the second object with the first object that references the multi-dimensional data in response to the request, and
wherein the java byte-code executable software instructions enable the first object to calculate a memory address into the multi-dimensional data referenced by the first object.

13. A computing system comprising:
at least one processor;
an object model operable by the at least one processor to, during execution of an enterprise software application on the computer system, receive a request for multi-dimensional data referenced by a first object, the first object being maintained by the object model within an object store of an enterprise planning system;
wherein in response to receiving the request, the object model causes the first object to dynamically generate at least a portion of executable software instructions for a second object, wherein the portion of the executable software instructions is based on at least one of a dimensionality and arrangement of the multi-dimensional data referenced by the first object, wherein at least the portion of the executable software instructions enables the second object to calculate a memory address into the multi-dimensional data referenced by the first object; and
wherein the first object instantiates the second object within the object store of the enterprise planning system, wherein the second object includes at least the portion of the executable software instructions and utilizes at least the portion of the executable software instructions to satisfy the request.

14. The computing system of claim 13,
wherein the object store stores the first object by storing one of a virtual dataset object, a virtual selection dataset object, and a dataset object that references the multi-dimensional data, and
wherein the object model receives the request for multi-dimensional data by receiving a request for multi-dimensional data referenced by one of a virtual dataset object, a virtual selection dataset object, and a dataset object.

15. The computing system of claim 13, wherein the portion of the executable software instructions enables the second object to further calculate the memory address into the multi-dimensional data referenced by the first object without having to make a function call to the first object.

16. The computing system of claim 13,
wherein the object model causes the first object to dynamically generate the portion of the executable software instructions by dynamically generating a portion of the executable software instructions for an indexer object in response to the request, and
wherein the portion of the executable software instructions enables the indexer object to calculate a memory address into the multi-dimensional data referenced by the first object.

17. The computing system of claim 16, wherein the object model that causes the first object to dynamically generate the portion of the executable software instructions comprises an object model that causes a virtual selection dataset object to dynamically generate a portion of the executable software instructions for the indexer object in response to the request.

18. The computing system of claim 13,
wherein the object model causes the first object to dynamically generate the portion of the executable software instructions by dynamically generating a portion of the executable software instructions for a data provider element included within a virtual function dataset object in response to the request, and
wherein the portion of the executable software instructions enables the data provider element to calculate a memory address into the multi-dimensional data referenced by the first object.

19. The computing system of claim 18,
wherein the object store further stores a third object that references additional multi-dimensional data, and
wherein the object model receives the request by receiving a request for the multi-dimensional data and additional multi-dimensional data referenced by the respective first and third objects and further causes the third object to dynamically generate another portion of the executable software instructions for the data provider element included within the virtual function dataset object in response to the request, and further wherein the portion of the executable software instructions enables the data provider element to calculate a memory address into the additional multi-dimensional data referenced by the third object.

20. The computing system of claim 19,
wherein the object model further causes the first object to dynamically generate the portion of the executable software instructions by:
receiving an executable software instructions object from the virtual function dataset object;
dynamically generating the portion of the executable software instructions for the data provider element of the virtual function dataset object;
writing the dynamically generated portion of the executable software instructions to the executable software instructions object; and,
wherein the object model further causes the third object to dynamically generate the portion of the executable software instructions by:
receiving the executable software instructions object from the virtual function dataset object;
dynamically generating the other portion of the executable software instructions for the data provider element of the virtual function dataset object; and
writing the dynamically generated other portion of the executable software instructions to the executable software instructions object.

21. The computing system of claim 13,
wherein the object model causes the first object to dynamically generate the portion of the executable software instructions by dynamically generating a portion of the executable software instructions for a data provider element included within an aggregation dataset object in response to the request, and
wherein the portion of the executable software instructions enables the data provider element to calculate a memory address into the multi-dimensional data referenced by the first object.

22. The computing system of claim 21,
wherein the object store further stores a third object that references additional multi-dimensional data, and
wherein the object model receives the request by receiving a request for the multi-dimensional data and additional multi-dimensional data referenced by the respective first and third objects and further causes the third object to dynamically generate another portion of the executable software instructions for the data provider element included within the aggregation dataset object in response to the request, and further wherein the portion of the executable software instructions enables the data provider element to calculate a memory address into the additional multi-dimensional data referenced by the third object.

23. The computing system of claim 22,
wherein the object model causes the first object to dynamically generate the portion of the executable software instructions by:
receiving an executable software instructions object from the aggregation dataset object;
dynamically generating the portion of the executable software instructions for the data provider element of the aggregation dataset object;
writing the dynamically generated portion of the executable software instructions to the executable software instructions object; and,
wherein the object model causes the third object to dynamically generate the portion of the executable software instructions by:
receiving the executable software instructions object from the aggregation dataset object;
dynamically generating the other portion of the executable software instructions for the data provider element of the aggregation dataset object; and
writing the dynamically generated other portion of the executable software instructions to the executable software instructions object.

24. The computing system of claim 13,
wherein the object model causes the first object to dynamically generate the portion of the executable software instructions by dynamically generating java byte-code executable software instructions for the second object in response to the request, and
wherein the java byte-code executable software instructions enables the first object to calculate a memory address into the multi-dimensional data referenced by the first object.

25. A computer-readable memory comprising instructions for causing a programmable processor to:
receive a request for multi-dimensional data referenced by a first object, the first object being maintained by an object model within an object store of an enterprise planning system;
in response to receiving the request, the object model causing the first object to dynamically generate a portion of the executable software instructions for a second object that references the multi-dimensional data, wherein the portion of the executable software instructions is based on at least one of a dimensionality and arrangement of the multi-dimensional data referenced by the first object, wherein the portion of the executable software instructions enables the second object to calculate a memory address into the multi-dimensional data referenced by the first object; and
instantiate, by the first object, the second object within the object store of the enterprise planning system, wherein the second object includes the dynamically generated portion of the executable software instructions and utilizes the dynamically generated portion of the executable software instructions to satisfy the request.

26. The computer-readable memory of claim 25, wherein the portion of the executable software instructions enables the second object to further calculate the memory address into the multi-dimensional data referenced by the first object without having to make a function call to the first object.

27. The computer-readable memory of claim 25, wherein the instructions cause the processor to dynamically generate the portion of the executable software instructions by dynamically generating a portion of the executable software instructions for an indexer object with the first object that references the multi-dimensional data in response to the request, wherein the portion of the executable software instructions enables the indexer object to calculate a memory address into the multi-dimensional data referenced by the first object.

28. The computer-readable memory of claim 25, wherein the instructions cause the processor to dynamically generate the portion of the executable software instructions by dynamically generating a portion of the executable software instructions for a data provider element included within a virtual function dataset object with the first object that references the multi-dimensional data in response to the request, wherein the portion of the executable software instructions enables the data provider element to calculate a memory address into the multi-dimensional data referenced by the first object.

29. The computer-readable memory of claim 25, wherein the instructions cause the processor to dynamically generate the portion of the executable software instructions by dynamically generating a portion of the executable software instructions for a data provider element included within an aggregation dataset object with the first object that references the multi-dimensional data in response to the request, wherein the portion of the executable software instructions enables the data provider element to calculate a memory address into the multi-dimensional data referenced by the first object.

30. The computer-readable memory of claim 25, wherein the instructions cause the processor to dynamically generate the portion of the executable software instructions by dynamically generating java byte-code executable software instructions for the second object with the first object that references the multi-dimensional data in response to the request, wherein the java byte-code executable software instructions enables the first object to calculate a memory address into the multi-dimensional data referenced by the first object.

* * * * *